United States Patent
Wilson

(10) Patent No.: US 6,336,804 B1
(45) Date of Patent: *Jan. 8, 2002

(54) ADJUSTABLE ROLLER ASSEMBLY FOR PRODUCING SHEETED FOOD PRODUCTS

(76) Inventor: Barry F. Wilson, 9526 Ann St., Santa Fe Springs, CA (US) 90670

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/157,680

(22) Filed: Sep. 21, 1998

(51) Int. Cl.[7] .............................................. B29C 43/46
(52) U.S. Cl. ........................ 425/367; 425/363; 425/194
(58) Field of Search ................................. 425/367, 363, 425/194; 426/517

(56) References Cited

U.S. PATENT DOCUMENTS

| | | | | |
|---|---|---|---|---|
| 2,898,873 A | * | 8/1959 | Cale ............................ | 425/367 |
| 4,260,578 A | * | 4/1981 | Moody ........................ | 425/367 |
| 5,006,056 A | * | 4/1991 | Mainstone et al. .......... | 425/194 |
| 5,112,208 A | * | 5/1992 | Voth ............................ | 425/367 |
| 5,295,803 A | * | 3/1994 | Ogawa et al. ............... | 425/141 |
| 5,499,912 A | * | 3/1996 | Mezei ......................... | 425/363 |
| 5,571,549 A | * | 11/1996 | Ouellette et al. ........... | 416/517 |
| 5,811,137 A | * | 9/1998 | Clark et al. ................. | 425/367 |

* cited by examiner

Primary Examiner—Nam Nguyen
Assistant Examiner—Thu Khanh T. Nguyen
(74) Attorney, Agent, or Firm—Edgar W. Averill, Jr.

(57) ABSTRACT

An adjustable roller assembly for producing sheeted food products of an accurate thickness which includes an adjustable roller positioned adjacent a second roller. The adjustable roller is held in bearings which are eccentrically mounted in a pair of turnable members which are supported by a first bearing. The axis of rotation of the adjustable roller is offset from the axis of rotation of the turnable members. The polar orientation of the turnable members is continuously adjustable to provide the desired thickness of the sheeted food product. Preferably, the orientation of the turnable member at one end of the adjustable roller is adjustable independently of the roller orientation of the other turnable member. The process for continuously forming a thin sheet of a food product of a uniform thickness independent of the variations of the rheology of the food product and includes a step of continuously feeding a sheet of food products between two rollers with at least one of the rollers being an adjustable roller. The adjustable roller is mounted between a pair of bearings held eccentrically in a pair of turnable members. The distance between the two rollers is measured which provides a signal which turns the turnable member thereby changing the axis of rotation of the adjustable roller to provide a constant product thickness.

4 Claims, 3 Drawing Sheets

ADJUSTABLE ROLLER ASSEMBLY FOR PRODUCING SHEETED FOOD PRODUCTS

BACKGROUND OF THE INVENTION

The field of the invention is food machinery and the invention relates more particularly to food machinery of the type which forms a continuous sheet of a food preparation product such as dough or masa which is then cut to form raw chips which are cooked to provide consumer products such as corn chips or potato chips. One method of carrying out this process is shown in U.S. Pat. No. 5,571,549. In this structure, invented in part by the present applicant, one of the rollers is adjustable. This adjustment is provided by mounting the roller on a frame which is pivoted. A servo motor drive gear is sensitive to the space between two portions of the frame and adjusts the pressure between the two rollers accordingly. While such system is adequate for many purposes, there are some types of food products which are resistant enough to being sheeted that this structure does not provide sufficient force to provide a thin sheet of consistent thickness.

BRIEF SUMMARY OF THE INVENTION

It is an object of the present invention to provide a food processing machine which includes an adjustable roller which is adjustable with such accuracy and supported with such strength as to provide a constant thickness of a sheeted product in spite of the difficulty in forming a sheeted product.

This invention is for an adjustable roller assembly for producing sheeted food products of an accurate thickness. The assembly includes an adjustable roller positionable adjacent a second roller. The assembly includes a frame which has two opposing roller support frame members. A first pair of opposed bearings is held by the roller support frame members and the first pair of opposed bearings have an aligned center along a first axis of rotation. A pair of turnable members are supported in the first pair of opposed bearings and these turnable members are moveable through at least an arc centered about the first axis of rotation. A second pair of opposed bearings is held by the turnable members and the second pair of opposed bearings support an adjustable roller about a second axis of rotation which is parallel to the first axis of rotation, but is offset from the first axis of rotation. Means are provided for rotating the adjustable roller about the second axis of rotation. Means are also provided for adjustably setting the polar orientation of the first pair of turnable members, thereby changing the center of rotation of the adjustable roller to provide an accurate end product thickness. Preferably, the turnable members are turned by the adjustable position of a pair of drive gears which move a driven gear attached to the turnable members. Also preferable, the turnable member at one end of the adjustable roller is independently adjustable from that at the other end. A process for continuously forming a thin sheet of uncooked food product of a uniform thickness in spite of variations of the rheology of the uncooked food product comprises the steps of continuously feeding a sheet of an uncooked food product in a dough-like form between the nip between two rollers. At least one of the two rollers is an adjustable roller which is mounted between a pair of bearings which is held eccentrically in a pair of turnable members supported by a frame. Means are provided for measuring the width of the nip between the rollers to provide a signal sensitive to the width of the nip. Means sensitive to this signal are used to set the rotational position of the turnable members, thereby causing the adjustable roller to be moved to correct for a change in the width of the nip, thereby providing a product of highly uniform thickness of sheeted uncooked product. The term "uncooked" is intended to mean not fully cooked and may include a product which has been partially cooked.

DESCRIPTION OF THE PREFERRED EMBODIMENTS

Figure 1:
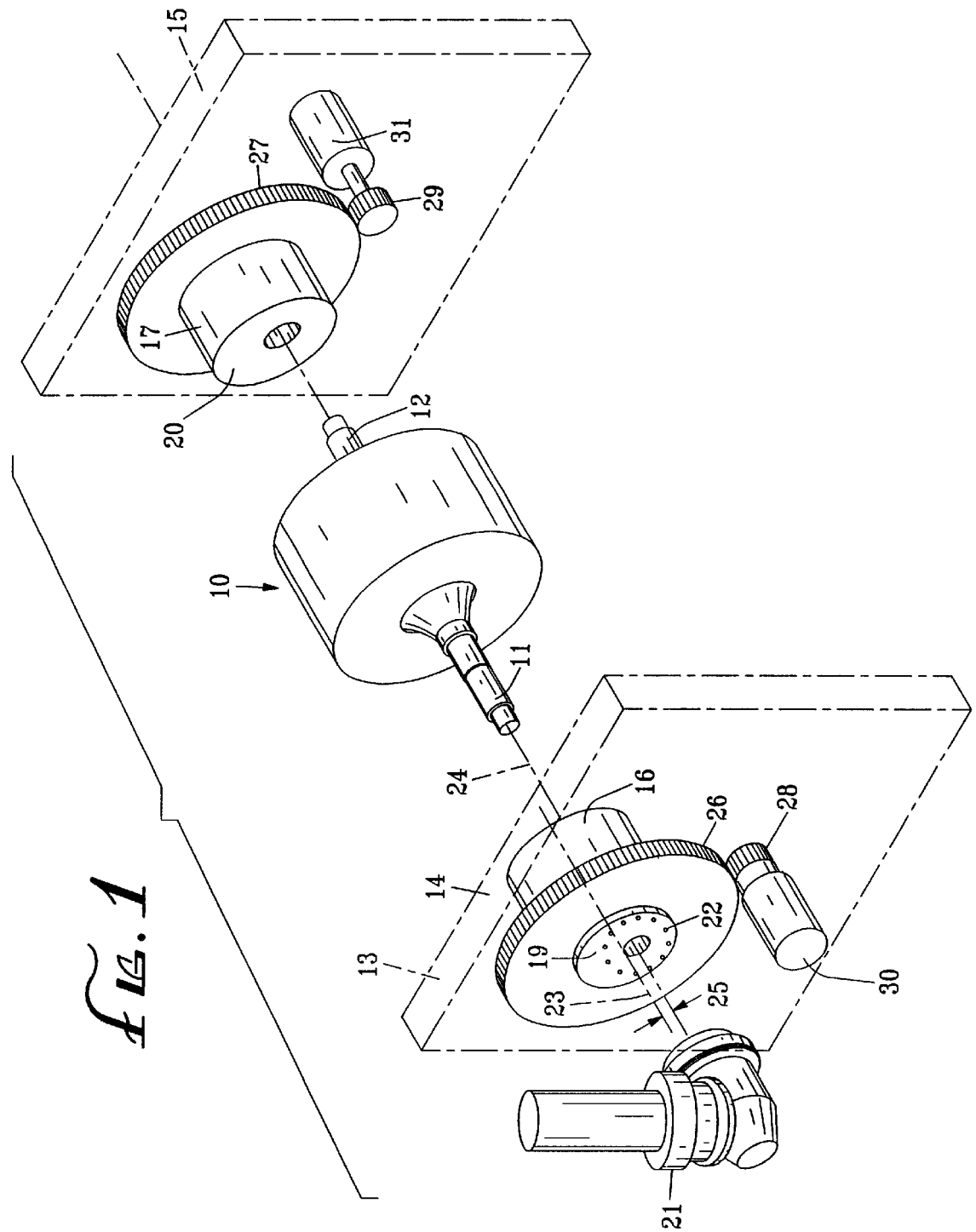
FIG. 1 is a perspective diagrammatic view of the adjustable roller assembly of the present invention.

An adjustable roller 10 is shown in an exploded perspective view in FIG. 1. The adjustable roller is of the type used adjacent a second roller (not shown) typically similar in size and shape to the adjustable roller. The second roller may be a fixed roller or may also be adjustable. Adjustable roller 10 is held by two end shafts 11 and 12 which are supported by an assembly which is held by a frame 13 which has two roller support members 14 and 15. Frame members 14 and 15 support a first pair of opposed bearings 16 and 17 which permit the turning of a pair of turnable members 19 and 20. Turnable member 19 supports a motor and gear assembly 21 which is keyed to end shaft 11. A number of bolt holes 22 are shown in turnable member 19 to which the motor and gear assembly 21 is bolted. The first pair of opposed bearings has an axis of rotation indicated by reference character 23. A second axis of rotation 24 is the axis of rotation of adjustable roller 10 and it can be seen that the two axis of rotation 23 and 24 are offset by an offset distance 25.

The turnable members 19 and 20 are turned to a desired polar position by driven gears 26 and 27. These driven gears are in turn provided with means for adjusting the polar orientation of the turnable members which are indicated by drive gears 28 and 29. Preferably, each of these drive gears is turned by separate motors 30 and 31. This permits the turnable members 19 and 20 to be independently turned. Of course, the two gears 28 and 29 may be on one shaft and move both ends of the adjustable roller at the same time.

Figure 2:
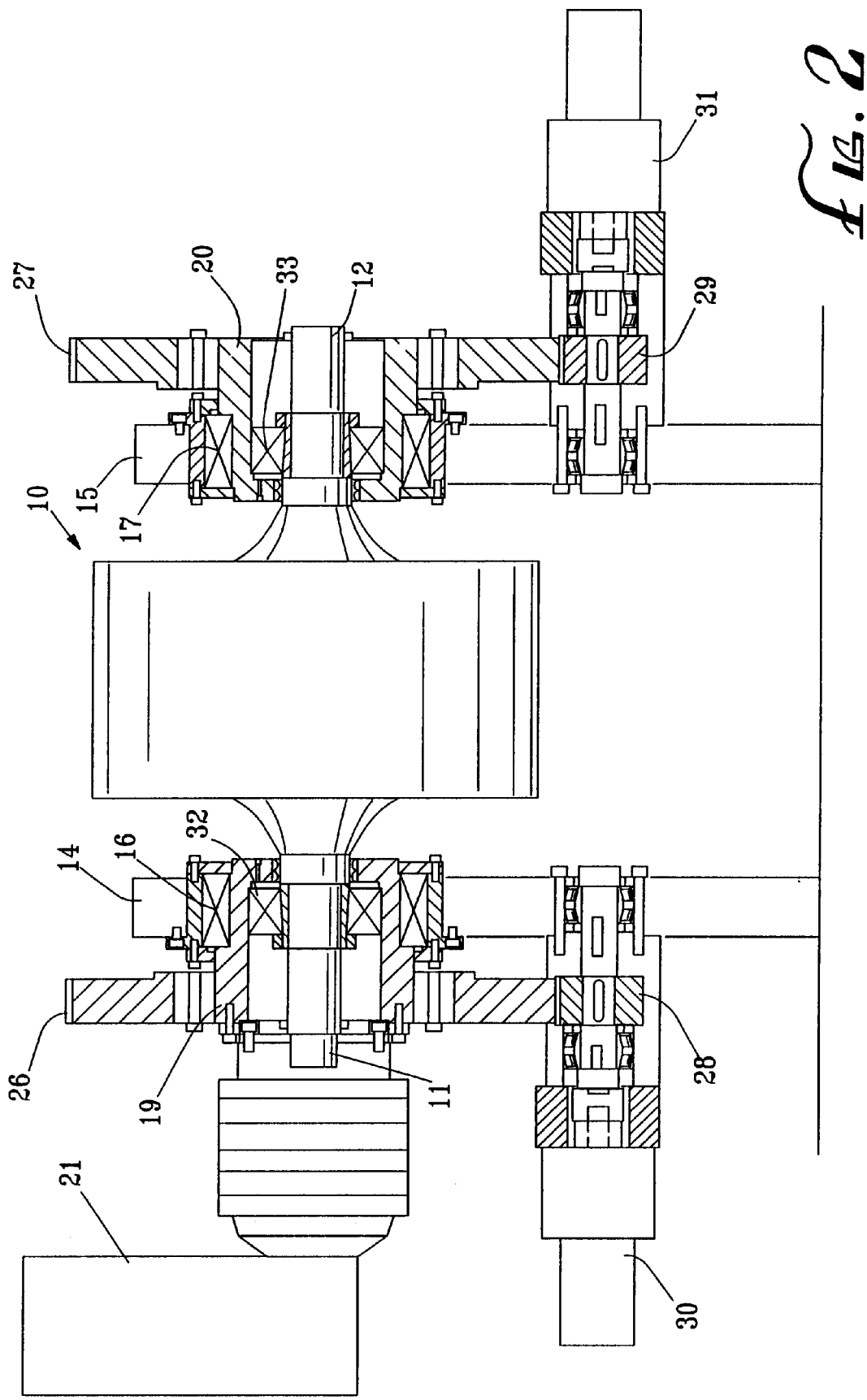
FIG. 2 is a front view partially in cross-section of the adjustable roller of FIG. 1.

Further details of the assembly are shown in FIG. 2 where adjustable roller 10 is seen turned by motor and gear assembly 21. The turnable members 19 and 20 are seen supported in bearings 16 and 17 supported by frame members 14 and 15. The end shafts 11 and 12 and adjustable roller 10 are rotatingly held by bearings 32 and 33 which are respectively supported in turnable members 19 and 20. The attachment of the motor and gear assembly 21 to turnable member 19 is clearly indicated in FIG. 2.

Figure 3:
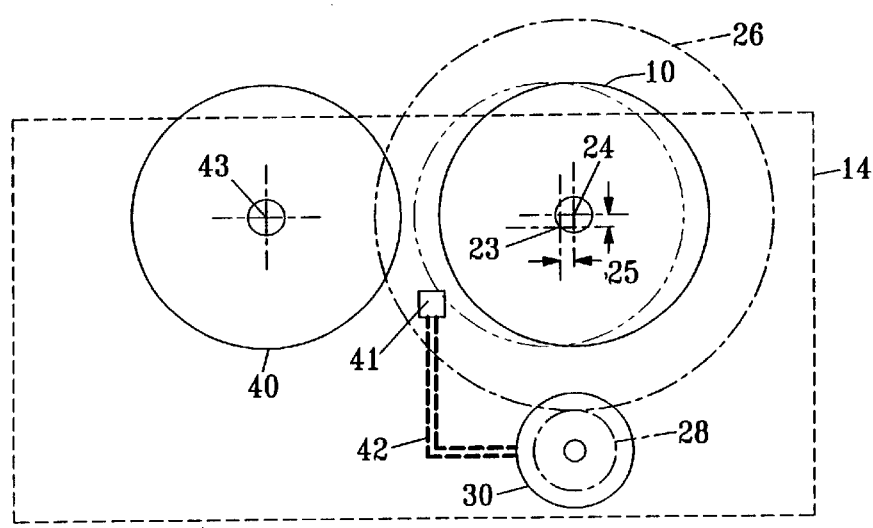
FIG. 3 is a diagrammatic side view of an adjustable roller assembly mounted adjacent a fixed roller.
Figure 4:
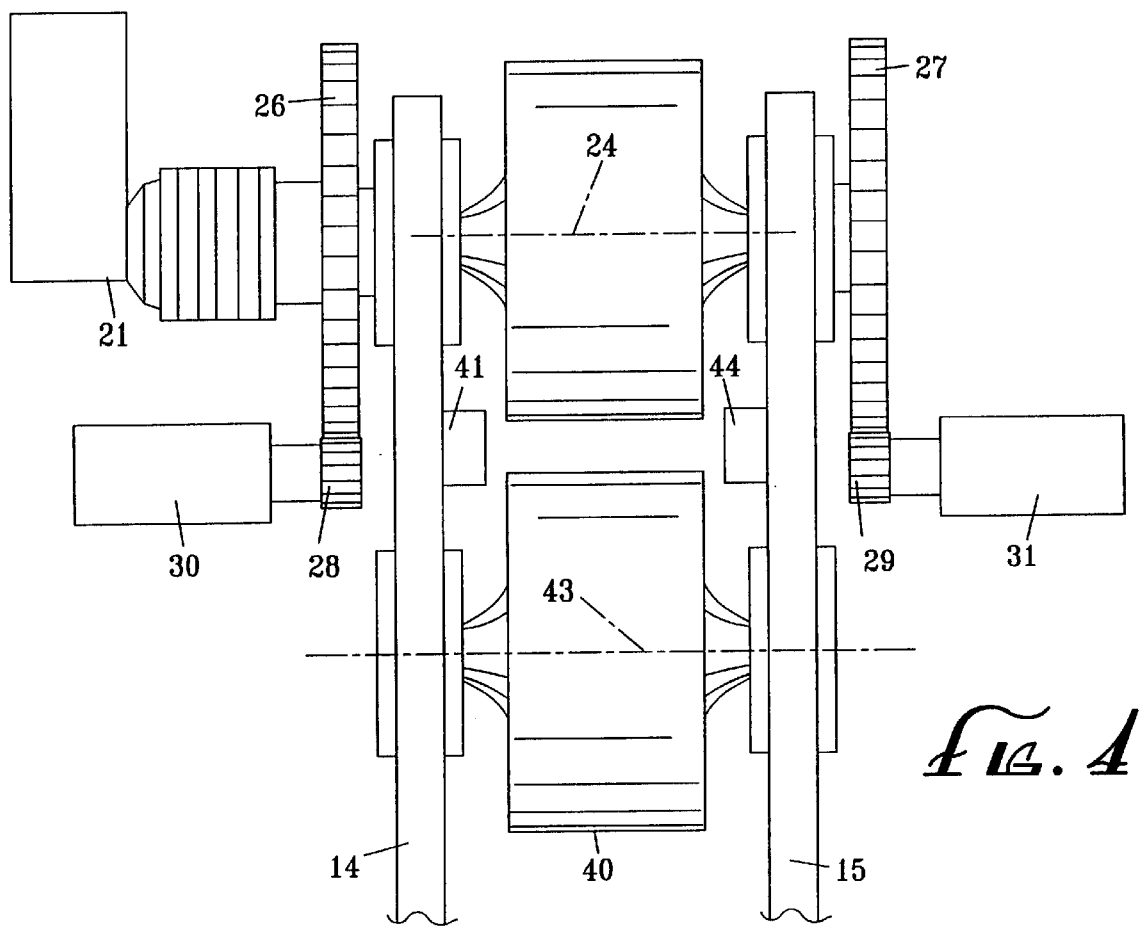
FIG. 4 is an end view of the assembly of FIG. 3.

Means are provided either to measure the thickness of the produced uncooked food product or the distance between the adjustable roller 10 and a fixed roller 40 shown in FIG. 3. Nip sensing means is indicated by reference character 41 and may be any known method. Sensing means 41 sends a signal 42 to motors 30 and 31 which turn gear 28 which in turn rotates driven gear 26 thereby changing the second axis of rotation 24 with respect to the axis of rotation 43 of fixed roller 40. The frequency of adjustment may be changed with the precision required. The adjustment may also be done continuously and this is preferred. The nip at one end of the roller can be measured independently from the nip at the other end and independent sensing means for each side can be provided as indicated diagrammatically in FIG. 4.

The result is a food processing machine of heretofore unknown controllability capable of handling materials of very high flow resistance without creating variations in the thickness of the finished product.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. An adjustable roller assembly for producing sheeted uncooked food products of an accurate thickness including an adjustable roller positionable adjacent a second roller, said adjustable roller assembly comprising:

a frame (13) including two opposing adjustable-roller-supporting frame members (14);

a pair of eccentric bearing supporting turnable members (19) supported by said two opposing adjustable-roller-supporting frame members (14), said pair of eccentric bearing supporting turnable members (19) being turnable about a first axis of rotation (23) and having an outwardly facing exterior surface;

a pair of eccentric bearings (32) held by said pair of eccentric bearing supporting turnable members (19), said eccentric bearings (32) supporting said adjustable roller and said eccentric bearings positioned about a second axis of rotation (24) offset (25) with respect to said first axis of rotation (23);

means for rotating said adjustable roller about said axis of rotation comprising a drive motor assembly (21) affixed to at least one of said pair of eccentric bearing supporting turnable members (19) on the outwardly facing exterior surface thereon; and means for adjustably setting the polar orientation of said eccentric bearing supporting turnable members thereby changing the second axis of rotation and thereby changing the polar orientation of said drive motor assembly.

2. The adjustable roller of claim 1, wherein said means for adjustably setting the polar orientation of each of said pair of turnable members comprises:

a pair of driven gears, one of each of said pair of driven gears being affixed to said pair of turnable members, said gears being centered at said first axis of rotation; and means for adjustably turning said driven gears.

3. The adjustable roller of claim 2 wherein said means for adjustably turning one of said driven gears is a motor turning a drive gear meshed with said driven gear.

4. The adjustable roller of claim 3 wherein said means for adjustably turning one of said driven gears is independent of means for adjustably turning the other of said driven gears.

* * * * *